(12) United States Patent
Cho et al.

(10) Patent No.: US 9,158,342 B2
(45) Date of Patent: Oct. 13, 2015

(54) MOBILE DEVICE AND METHOD OF CONTROLLING THEREFOR

(71) Applicant: LG ELECTRONICS INC., Seoul (KR)

(72) Inventors: Eunhyung Cho, Seoul (KR); Sinae Chun, Seoul (KR); Jongho Kim, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/075,672

(22) Filed: Nov. 8, 2013

(65) Prior Publication Data

US 2015/0036000 A1    Feb. 5, 2015

(30) Foreign Application Priority Data

Jul. 31, 2013  (KR) .................. 10-2013-0090938

(51) Int. Cl.
  *H04N 5/225*  (2006.01)
  *G06F 1/16*  (2006.01)
  *G06F 3/00*  (2006.01)

(52) U.S. Cl.
  CPC ............ *G06F 1/1686* (2013.01); *G06F 1/1626* (2013.01); *G06F 3/005* (2013.01)

(58) Field of Classification Search
  USPC ..................... 348/333.11, 207.1; 455/556.1
  See application file for complete search history.

(56) References Cited

U.S. PATENT DOCUMENTS

| | | | |
|---|---|---|---|
| 2005/0096084 A1* | 5/2005 | Pohja et al. | 455/556.1 |
| 2013/0083208 A1 | 4/2013 | Koh | |
| 2013/0148003 A1* | 6/2013 | Penev et al. | 348/333.11 |

FOREIGN PATENT DOCUMENTS

| | | |
|---|---|---|
| KR | 10-2007-0023880 A | 3/2007 |
| KR | 10-2012-0036211 A | 4/2012 |
| KR | 10-2013-0070670 A | 6/2013 |

* cited by examiner

*Primary Examiner* — Roberto Velez
*Assistant Examiner* — Stephen Coleman
(74) *Attorney, Agent, or Firm* — Birch, Stewart, Kolasch & Birch, LLP (57) ABSTRACT

The present specification relates to a mobile device and a method of controlling therefor, and more particularly, if a photographer is not an owner of the mobile device, to a method of sharing a captured image with the photographer recognized by biometrics.

According to one embodiment, the mobile device includes a display unit configured to display a visual information, a camera unit configured to capture an image, a storage unit configured to store the captured image, a communication unit configured to transmit the captured image, a sensor unit configured to detect a user input and configured to deliver an input signal according to a detected result to a processor, and a processor configured to control the display unit, the image capturing unit, the storage unit, the communication unit, and the sensor unit, wherein the processor is further configured to detect an input signal, capture an image and detect a first identification information of a photographer providing the input signal based on the detected input signal, transmit the captured image to an address of the photographer when the first identification of the photographer is not matched with a second identification information of an owner of the mobile device.

19 Claims, 9 Drawing Sheets

MOBILE DEVICE AND METHOD OF CONTROLLING THEREFOR

This application claims the benefit of the Korean Patent Application No. 10-2013-0090938, filed on Jul. 31, 2013, which is hereby incorporated by reference as if fully set forth herein.

BACKGROUND OF THE INVENTION

1. Field of the Invention

The present specification relates to a mobile device and a method of controlling therefor, and more particularly, if a photographer is not an owner of the mobile device, to a method of sharing a captured image with the photographer recognized via biometrics.

2. Discussion of the Related Art

Biometrics indicates a technology used for precisely identifying a person in a manner of extracting and analyzing a physical and behavioral characteristic of a human using an automated device. A technology using the physical characteristic among biometrics includes fingerprint recognition, an iris-scan, a retina-scan, hand geometry, facial recognition, and the like. A technology using the behavioral characteristic among the biometrics includes voice recognition, a signature scan, and the like.

Biometrics can use such an immutable physical or behavioral characteristic of a human as a fingerprint or voice to identify a person. And, biometrics can be used in such various fields as an access control, a diligence and laziness management, a building integration system, a banging automation device, a computer security field, E-commerce authentication, and the like.

SUMMARY OF THE INVENTION

Accordingly, the present specification is directed to an apparatus and method thereof that substantially obviate one or more problems due to limitations and disadvantages of the related art.

According to one embodiment, the present specification intends to provide a method of easily sharing a captured image not including a photographer with the photographer capturing the image including at least one person.

According to a different embodiment, the present specification intends to provide a method of easily sharing a captured image with a person included in the captured image and a photographer via biometrics information of the person included in the captured image and the photographer.

According to a different embodiment, the present specification intends to provide an image transmission interface capable of transmitting a captured image according to whether a person included in the captured image and a photographer correspond to a user registered in a mobile device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile device includes a display unit configured to display a visual information, a camera unit configured to capture an image, a storage unit configured to store the captured image, a communication unit configured to transmit the captured image, a sensor unit configured to detect a user input and transmit an input signal according to a detected result to a processor, and a processor configured to control the display unit, the image capturing unit, the storage unit, the communication unit, and the sensor unit, the processor is further configured to detect an input signal, capture an image and detect a first identification information of a photographer providing the input signal based on the detected input signal, transmit the captured image to an address of the photographer when the first identification information of the photographer is not matched with second identification information of an owner of the mobile device.

To achieve these objects and other advantages and in accordance with the purpose of the invention, as embodied and broadly described herein, according to a different embodiment, a method of controlling a mobile device includes the steps of detecting an input signal, capturing an image and detecting a first identification information of a photographer providing the input signal based on the detected input signal, and transmitting the captured image to an address of the photographer when the first identification information of the photographer is not matched with a second identification information of an owner or the mobile device.

According to one embodiment, although a photographer is not included in an image captured by the photographer, a mobile device can easily share the captured image with the photographer in a manner of detecting biometrics information of the photographer.

According to another embodiment, if a photographer is not a user registered in a mobile device, the mobile device can easily share a captured image with the photographer in a manner of inputting biometrics information of the photographer, address information, and the like via an image transmission interface.

According to another embodiment, a mobile device can easily transmit a captured image to an address of a person included in the captured image and an address of a photographer in a manner of detecting biometrics of the person included in the captured image and the photographer.

According to another embodiment, a mobile device can easily transmit a captured image to persons in a manner of recognizing the persons included in the captured image in case of capturing an image of the persons including a photographer by making a camera unit face towards the photographer.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4a to FIG. 4c is a diagram for a first embodiment of a method of controlling a mobile device according to the present specification;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
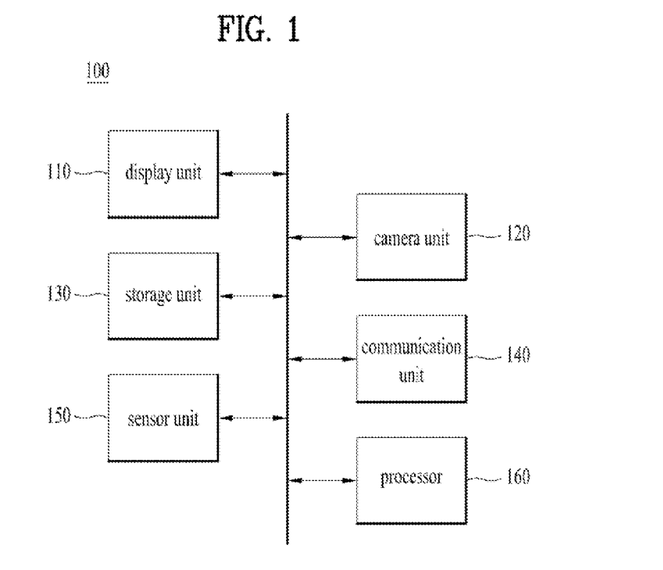
FIG. 1 is a block diagram of a mobile device according to the present specification.

FIG. 1 is a block diagram of a mobile device according to the present specification. Referring to FIG. 1, a mobile device 100 can include a display unit 110, a camera unit 120, a storage unit 130, a communication unit 140, a sensor unit 150, and a processor 160.

First of all, the mobile device 100 can include such various digital devices capable of displaying an image and portable as a PDA (personal digital assistant), a notebook, a tablet PC, a smartphone, a digital camera, and the like.

The display unit 110 can output content in a display screen. And, the display unit 110 can output content executed by the processor 160 or an image based on a control command of the processor 160. For instance, the content may include various videos, an image, and the like. According to the present specification, the display unit 110 can display visual information. For instance, the visual information may correspond to an image sensed by the camera unit 120.

The camera unit 120 can sense an image of a front direction of the mobile device 100. In this case, the front direction may indicate a direction to which the camera unit 120 of the mobile device 100 faces. And, the camera unit 120 can have an angle of view area of a predetermined range. In this case, the angle of view area may indicate a range of horizontal and vertical viewing angle capable of being included in a prescribed screen in case of taking a picture. According to the present specification, the camera unit 120 can sense an image positioned within the prescribed angle of view range of the front direction and can capture the image. And, according to the present specification, the camera unit 120 can include a plurality of camera units. For instance, the camera unit 120 can be installed in a side at which the display unit 110 of the mobile device 100 is positioned and a side opposite to the side at which the display unit 110 is positioned, respectively.

The storage unit 130 can store such various digital data as a video, au audio, an image, an application, and the like. The storage unit 130 can store a program configured for the processor 160 to process and control and may perform a function of temporarily storing input/output data. Meanwhile, the storage unit 130 can be positioned at the outside of the mobile device 100 as well as the inside of the mobile device 100. For instance, the storage unit 130 positioned at the outside of the mobile device 100 may correspond to a cloud service.

According to the present specification, the storage unit 130 can store an image captured by the camera unit 120. For instance, the storage unit 130 positioned at the inside of the mobile device 100 can include a storage unit for a temporary storage and a storage unit for a long-term storage.

The communication unit 140 can transmit/receive a data with an external device in a manner of performing a communication with the external device using various protocols. The communication unit accesses an external network in wired or wireless and can transceive such a digital data as content, and the like with the external network. For instance, the communication unit 140 can use a communication standard such as WLAN (wireless LAN) (WiFi), Wibro (wireless broadband), Wimax (world interoperability for microwave access), HSDPA (high speed downlink packet access) to access the wireless network.

According to the present specification, the communication unit 140 can transmit a captured image to an address of a photographer. In this case, the address of the photographer can include an e-mail address of the photographer, an IP (internet protocol) address of a device owned by the photographer, and the like. And, transmitting the captured image to the address of the photographer may correspond to sharing the captured image with the photographer. And, according to the present specification, the communication unit 140 can transmit the captured image to an address of at least one person included in the captured image.

The sensor unit 150 senses surrounding environment of the device using at least one sensor installed in the mobile device 100 and can deliver a sensed result to the processor 160 in a form of a signal. And, the sensor unit 150 senses a user input and can deliver a signal according to a sensed result to the processor 160.

And, the sensor unit 150 can include at least one sensing means. For instance, the at least one sensing means can include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensor unit 150 is a common name of the aforementioned various sensing means and can deliver sensed results to the processor to enable the processor 160 to perform an operation according to the sensed results in a manner of sensing various inputs of a user and environment of the device. The aforementioned sensors may be included in the mobile device 100 as a separate element or may be included in the mobile device in a manner of being integrated to at least one element.

According to the present specification, the sensor unit 150 can detect an input signal of a user. In this case, the input signal of the user may correspond to an input signal configured to use biometrics. For instance, the input signal can include a fingerprint input, a voice input, an iris input, a face input, and the like. Regarding this, it shall be described again in FIG. 2.

The processor 160 processes a data, controls each of the units of the aforementioned mobile device 100, and can control data transmission/reception between units. According to the present specification, the processor 160 captures an image and can detect first identification information of a photographer based on a detected input signal. And, if the first identification information of the photographer is not matched with second identification information of an owner of the mobile device 100, the processor 160 can transmit a captured image to an address of the photographer. Regarding this, it shall be described again in FIG. 4 and FIG. 5.

Meanwhile, although it is not depicted in FIG. 1, the mobile device can include a power unit and an audio input/output unit. The power unit is a power source connected with an internal battery of the mobile device 100 or an external power supply and can supply power to the mobile device 100. And, the audio input/output unit detects audio information recognized at the outside of the mobile device and can release the audio information to the outside of the mobile device.

The mobile device 100 depicted in FIG. 1 is a block diagram according to one embodiment. Blocks represented in a manner of being separated indicate the logically distinguished elements of the mobile device 100. Hence, the elements of the aforementioned mobile device 100 can be equipped with a single chip or a plurality of chips according to the design of the device.

As one embodiment of the present specification, operations performed by the mobile device 100 can be controlled by the processor 160. For clarity, the operations are commonly depicted and explained as the mobile device 100 performs and controls the operations in the drawings and following description.

Figure 2:
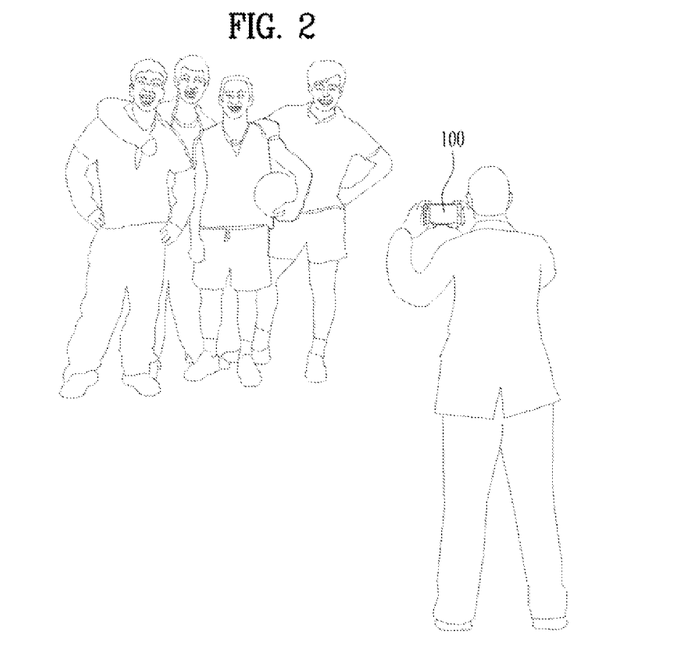
FIG. 2 is a diagram for a state of capturing an image using a mobile device according to the present specification.

FIG. 2 is a diagram for a state of capturing an image using a mobile device according to the present specification.

As depicted in FIG. 2, when five persons capture an image, there may occur a situation that one of the five persons takes a picture of the rest of four persons. In this case, the one taking a picture may not be continuously included in a group picture. Meanwhile, in case of capturing an image using the mobile device 100 capable of performing facial recognition, faces of the four persons included in the image are recognized and a captured image can be shared with the four persons whose faces are recognized. And, the image captured photographer may want to share the captured image although a face of the photographer is not included in the captured image. In this case, since the face of the image captured photographer is not recognized in the image, it may be difficult to share the image with the photographer.

In particular, besides the four persons included in the image, it is necessary for the mobile device 100 to share the image with the photographer in a manner of recognizing the image capturing photographer using the mobile device 100 although the photographer is not included in the image. Hence, the present specification intends to explain a method of sharing the captured image with the photographer not included in the captured image in FIG. 3 to FIG. 8.

Figure 3:
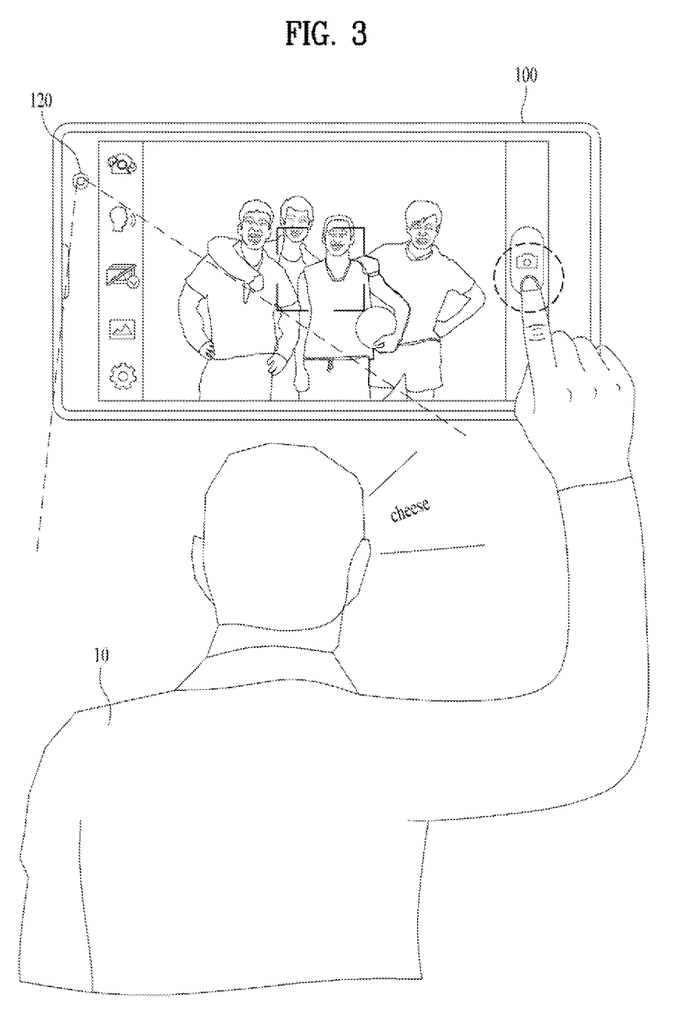
FIG. 3 is a diagram of biometrics information recognizable by a mobile device according to the present specification.

FIG. 3 is a diagram of biometrics information recognizable by a mobile device according to the present specification. More specifically, FIG. 3 is a diagram of a method of detecting biometrics information of a photographer 10 by the mobile device 100.

A biometrics technology indicates a technology for recognizing a human based on at least one unique physical or behavioral characteristic. For instance, the biometrics technology can identify the same person by performing acquisition, characteristic extraction, comparison, and similarity decision process. The acquisition indicates to convert a biological characteristic to a digital form. The characteristic extraction indicates to extract a unique and distinctive characteristic that every human has. And, the comparison indicates to compare a registered characteristic with an inputted characteristic. The similarity decision indicates to judge whether two compared characteristics correspond to a characteristic of the same person.

The biometrics technology is a technology according to a physical characteristic including a fingerprint, an iris, a face, veins, and the like and the biometrics technology is the technology according to a behavioral characteristic including a voice, a signature, and the like. For instance, as depicted in FIG. 3, the mobile device 100 can use the biometrics technology such as fingerprint recognition, voice recognition, iris-scan, facial recognition, and the like. Besides the aforementioned biometrics technologies, the mobile device 100 can recognize a person by using such various biometrics technologies not depicted in FIG. 3 as pulse recognition, veins recognition, and the like.

First of all, in case of the fingerprint recognition technology, it is a technology using a point that every person has a different fingerprint. According to the present specification, the mobile device 100 can detect fingerprint information of a photographer using a fingerprint detected from a touch input or a hovering input of the photographer 10. The iris-scan technology is a technology using a point that an iris never changes for lifetime and every person has a different iris. According to the present specification, the mobile device 100 can detect iris information of the photographer 10 via the iris of the photographer 10 detected by the camera unit 120.

And, the facial recognition technology is a technology for recognizing a person in consideration of a shape of eyes, a nose, and a mouth of the person, shadow, distance, and the like. According to the present specification, the mobile device 100 can detect facial recognition information of the photographer 10 via a face of the photographer 10 detected by the camera unit 120. And, the voice recognition technology is a technology for recognizing a person via a phonetic characteristic of the person when the person speaks. According to the present specification, the mobile device 100 can detect voice information of the photographer 10 in a manner of recognizing a voice of the photographer 10 via the audio input/output unit when the photographer 10 says 'cheese'.

Figure 4:
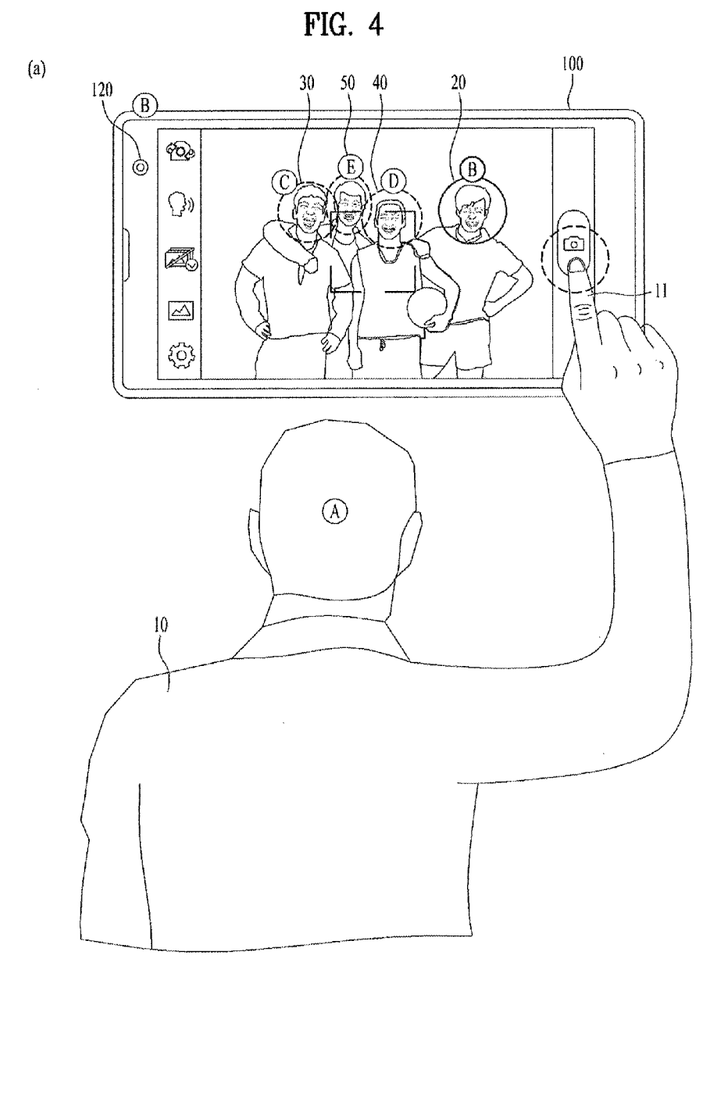

FIG. 4 is a diagram for a first embodiment of a method of controlling a mobile device according to the present specification. More specifically, in case that a photographer 10 takes a picture, FIG. 4a to FIG. 4c indicates a method of sharing an image with the photographer and persons (20, 30, 40, and 50) included in the image.

First of all, although it is not depicted in FIG. 4a, an image capturing application of the mobile device 100 can be activated by the photographer 10. In this case, the image capturing application may correspond to an application to capture an image sensed by the camera unit. And, when the image capturing application is activated, the mobile device 100 can display the image sensed by the camera unit in the display unit. And, the mobile device 100 can recognize at least one person in the sensed image. Referring to FIG. 4a, the mobile device can recognize four persons, i.e., a person B 20, a person C 30, a person D 40, and a person E 50 in the sensed image. In this case, the person B 20 corresponds to an owner of the mobile device 100. Meanwhile, if person information is stored in the mobile device, the persons recognized by the mobile device 100 are identifiable by the mobile device.

Next, the mobile device 100 can detect at least one input signal. In one embodiment, as depicted in FIG. 4a, the mobile device 100 can detect one input signal inputted on the mobile device 100. In this case, the one input signal may correspond to a signal configured to capture an image and configured to detect identification information of a photographer. For instance, the input signal can include a touch input for an image capturing trigger, a hovering input, a voice input for the audio unit, a facial recognition input for the camera unit, an iris input, and the like. Referring to FIG. 4a, the input signal may correspond to the touch input 11 for the image capturing trigger.

In another embodiment, the mobile device 100 can detect a plurality of input signals for the mobile device 100. For instance, a plurality of the input signals can include a first input signal and a second input signal. In this case, the first input signal may correspond to a signal configured to capture an image and the second input signal may correspond to a signal configured to detect the identification information of the photographer 10. For instance, the first input signal can include a touch input for the display unit. And, for instance, the second input signal can include a facial recognition input, an iris input, and the like for the camera unit 120.

Next, the mobile device 100 can capture a sensed image based on a detected input signal. In this case, the captured image can be stored in the storage unit configured for a temporary storage. And, the mobile device 100 can detect first identification information of a photographer 10 providing the input signal. In this case, the first identification information may correspond to biometrics information indicating the photographer 10. For instance, the first identification information can include facial recognition information, fingerprint information, veins information, pulse information, iris information, voice information, and the like of the photographer 10. Referring to FIG. 4a, the first identification information may correspond to the fingerprint information 11 of the photographer 10.

Next, the mobile device 100 can determine whether the first identification information of the photographer 10 is matched with second identification information of an owner of the mobile device 100. In this case, the second identification information may correspond to biometrics information indicating the owner of the mobile device 100. For instance, the second identification information can include facial recognition information, fingerprint information, veins information, pulse information, iris information, voice information, and the like of the owner of the mobile device 100. As depicted in FIG. 4a, the owner of the mobile device 100 corresponds to the person B 20. And, the second identification information may correspond to the fingerprint information stored in the mobile device 100. In particular, the mobile device 100 can determine whether the fingerprint information of the person A 10 is matched with the fingerprint information of the person B 20.

In relation to this, if the first identification information of the photographer 10 is matched with the second identification information of the owner of the mobile device 100, the mobile device 100 can store the captured image in the mobile device 100. In particular, the mobile device 100 can store the captured image stored in the storage unit configured for a temporary storage in the storage unit configured for a long-term storage. This is because if the owner of the mobile device corresponds to the photographer 10, sharing the captured image with the photographer 10 is identical to storing the captured image in the mobile device 100.

For instance, although it is not depicted in FIG. 4, if the person A 10 and the person B 20 are determined as the same person, the mobile device 100 can store the captured image in the mobile device 100. In one embodiment, if the first identification information of the photographer 10 is matched with the second identification information of the owner of the mobile device 100, it indicates a case that the first identification information is matched with the second identification information within a range of a predetermined rate. For instance, the range of the predetermined rate can be configured in various ways and may correspond to 70% to 100%. In another embodiment, if the first identification information of the photographer 10 is matched with the second identification information of the owner of the mobile device 100, a rate of matching the first identification information of the photographer with the second identification information of the owner of the mobile device 100 may correspond to a case that identification information of a different user is matched with the second identification information of the owner of the mobile device 100.

Meanwhile, the first identification information of the photographer 10 is not matched with the second identification information of the owner of the mobile device 100, the mobile device can transmit the captured image to an address of the photographer 10. In this case, the address of the photographer 10 may correspond to an e-mail address of the photographer, an IP (internet protocol) address of a device owned by the photographer 10, and the like. In one embodiment, if the first identification information of the photographer 10 is not matched with the second identification information of the owner of the mobile device 100, it may correspond to a case that the first identification information of the photographer 10 is matched less than the predetermined rate with the second identification information of the owner of the mobile device 100.

In this case, the mobile device 100 can determine whether the photographer 10 corresponds to a registered user of the mobile device 100. In this case, the registered user may indicate a user whose address is registered in the mobile device 100 to transmit an image. In one embodiment, if the photographer 10 corresponds to a user registered in the mobile device 100, the mobile device 100 can transmit the captured image to the address of the photographer 10. In another embodiment, if the photographer 10 corresponds to a user not registered in the mobile device 100, the mobile device 100 can provide an image transmission interface to transmit a captured image 1. Regarding to this, it shall be described again in FIG. 6.

And, if the first identification information of the photographer 10 is not matched with the second identification information of the owner of the mobile device 100, the mobile device 100 can provide an image sharing interface configured to determine whether the captured image is transmitted to the address of the photographer 10. Regarding this, it shall be described again in FIG. 7.

And, as depicted in FIG. 4b, if the owner B of the mobile device 100 is included in an image 1, the mobile device 100 can store the captured image in the mobile device 100 irrespective of whether the first identification information of the photographer 10 is matched with the second identification information of the owner of the mobile device 100. And, the mobile device 100 can transmit the captured image to an address of at least one person included in the image irrespective of whether the first identification information of the photographer 10 is matched with the second identification information of the owner of the mobile device 100.

As depicted in FIG. 4c, the mobile device 100 can transmit the captured image 1 to the addresses of person B, C, D, and E except the person B, which is the owner of the mobile device 100, among the persons included in the captured image 1. Meanwhile, if the person included in the captured image 10 is not the user registered in the mobile device 100, the mobile device can provide the image transmission interface. Regarding this, it shall be described again in FIG. 6.

Figure 5:
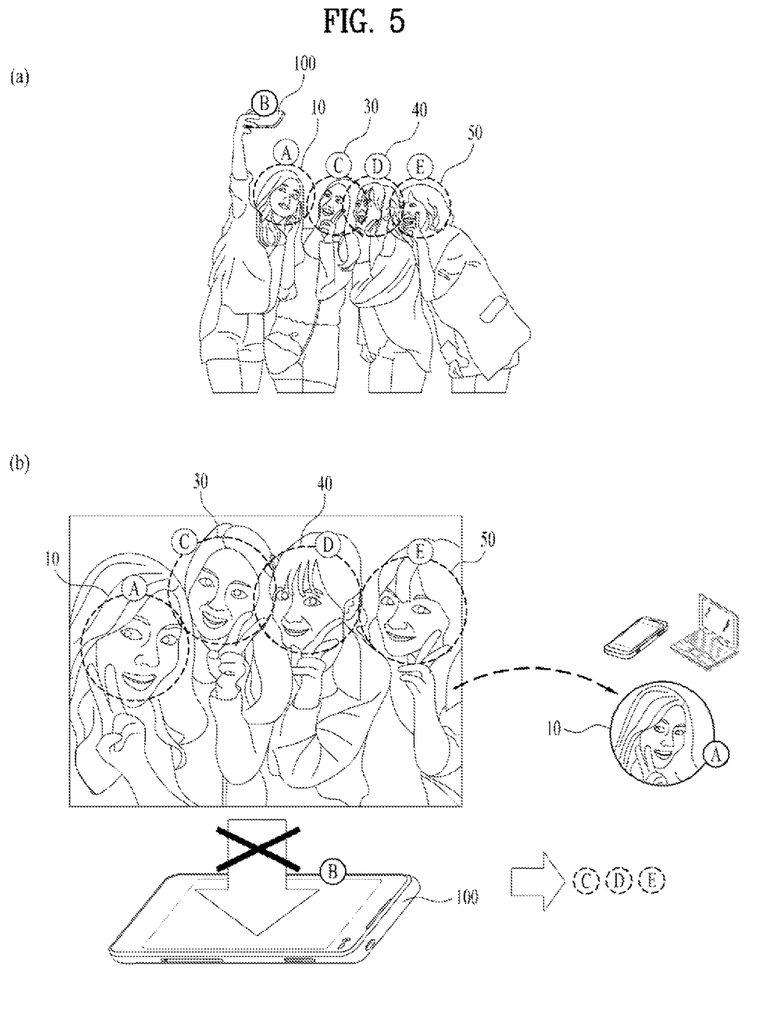
FIG. 5a to FIG. 5b is a diagram for a second embodiment of a method of controlling a mobile device according to the present specification.

FIG. 5 is a diagram for a second embodiment of a method of controlling a mobile device according to the present specification. More specifically, in case of capturing an image by the photographer 10, FIG. 5a and FIG. 5b indicate a method of sharing the image with persons (10, 20, 30, 40, and 50) included in the image.

First of all, as mentioned earlier in FIG. 4, although it is not depicted in FIG. 5a, the mobile device 100 can activate an image capturing application by the photographer 10. And, if the image capturing application is activated, the mobile device 100 can display an image sensed by the camera unit in the display unit. As depicted in FIG. 5a, while the camera unit faces the photographer, the mobile device 100 can display the image sensed by the camera unit. And, the mobile device 100 can recognize at least one person in the sensed image. Referring to FIG. 5a, the mobile device 100 can recognize four persons, i.e., a person A 10, a person C 30, a person D 40, and a person E 50 in the sensed image.

Subsequently, the mobile device 100 can detect at least one input signal. As mentioned earlier in FIG. 4, an input signal can include a fingerprint input, a face input, an iris input, a voice input, and the like. In one embodiment, although it is not depicted in FIG. 5, the mobile device 100 can detect an input signal inputted to the mobile device 100. For instance, referring to FIG. 5, the input signal inputted to the mobile device 100 may correspond to the face input of the photographer 10. And, the input signal inputted to the mobile device 100 may correspond to a signal configured to capture an image and configured to detect identification information of the photographer 10. In another embodiment, although it is not depicted in FIG. 5, the mobile device 100 can detect a plurality of input signals. In this case, a plurality of the input signals can include a first input signal to capture an image and a second input signal to detect identification information of the photographer 10. For instance, the first input signal may correspond to a touch input or a voice input and the second input signal may correspond to a face input.

Meanwhile, as depicted in FIG. 5a, if there are plural numbers of face inputs in the image sensed by the mobile device 100, it is necessary for the mobile device 100 to determine the photographer among a plurality of the people whose faces are recognized by mobile device. In this case, as depicted in FIG. 5a, a person A 10 positioned near the mobile device 100 may correspond to the photographer. This is because a person positioned near the mobile device 100 is easier to control the mobile device 100 compared to a person positioned far from the mobile device. And, it is because it is more natural for the person A 10 positioned near the mobile device 100 to capture an image using the mobile device 100. Hence, referring to FIG. 5a, the mobile device 100 can detect the face input of the person A 10 as an input signal.

Subsequently, the mobile device 100 can capture a sensed image based on the detected input signal. And, the mobile device 100 can detect first identification information of the photographer 10 providing the input signal based on the detected input signal. As mentioned earlier in FIG. 4, the first identification information may correspond to biometrics information for indicating the photographer 10. Referring to FIG. 5, the first identification information may correspond to the facial recognition information of the photographer 10.

Subsequently, the mobile device can determine whether the first identification information of the photographer 10 is matched with second identification information of an owner of the mobile device 100. In this case, the second identification information may correspond to biometrics information for indicating the owner of the mobile device 100. As depicted in FIG. 5a, the owner of the mobile device 100 corresponds to a person B (not depicted) and the person B is not included in the sensed image. And, the second identification information may correspond to facial recognition information of the person B (not depicted) stored in the mobile device 100.

Regarding this, as mentioned earlier in FIG. 4, if the first identification information of the photographer 10 is matched with the second identification information of the owner of the mobile device 100, the mobile device 100 can store a captured image in the mobile device 100.

On the contrary, if the first identification information of the photographer 10 is not matched with the second identification information of the owner of the mobile device 100, the mobile device 100 can transmit the captured image to an address of the photographer 10. As depicted in FIG. 5b, the mobile device 100 can transmit the captured image to the address of the person A 10, which is the photographer.

And, as depicted in FIG. 5b, the mobile device 100 can transmit the captured image to an address of at least one person included in the image irrespective of whether the first identification information of the photographer 10 is matched with the second identification information of the owner of the mobile device 100. Referring to FIG. 5b, the mobile device 100 can transmit the captured image 1 to the addresses of the person C, D, and E among the persons A, C, D, and E included in the captured image 1 except the person A, which is the photographer 10.

And, as depicted in FIG. 5b, if the owner of the mobile device 100 is not included in the image 1, the mobile device 100 may not store the captured image 1 in the mobile device 100 irrespective of whether the first identification information of the photographer 10 is matched with the second identification information of the owner of the mobile device 100. In particular, the mobile device 100 transmits the captured image 1 to the addresses of the persons A, C, D, and E included in the captured image and can delete the captured image 1 from the mobile device 100. This is because the captured image 1 can be temporarily stored in the storage unit configured for a temporary storage although the mobile device 100 does not separately store the captured image 1. And, this is because if the owner of the mobile device 100 is not included in the captured image 1, the mobile device 100 may not necessary to store the captured image 1 in the mobile device 100.

Meanwhile, if the owner B of the mobile device 100 is not included in the image 1, the mobile device 100 can provide an image deletion interface for determining whether the captured image 1 is deleted from the mobile device 100. This is because if the owner B of the mobile device 100 is not included in the captured image 1, the owner of the mobile device 100 may not want to store the captured image in the mobile device. Regarding this, it shall be described again in FIG. 7b.

Figure 6:
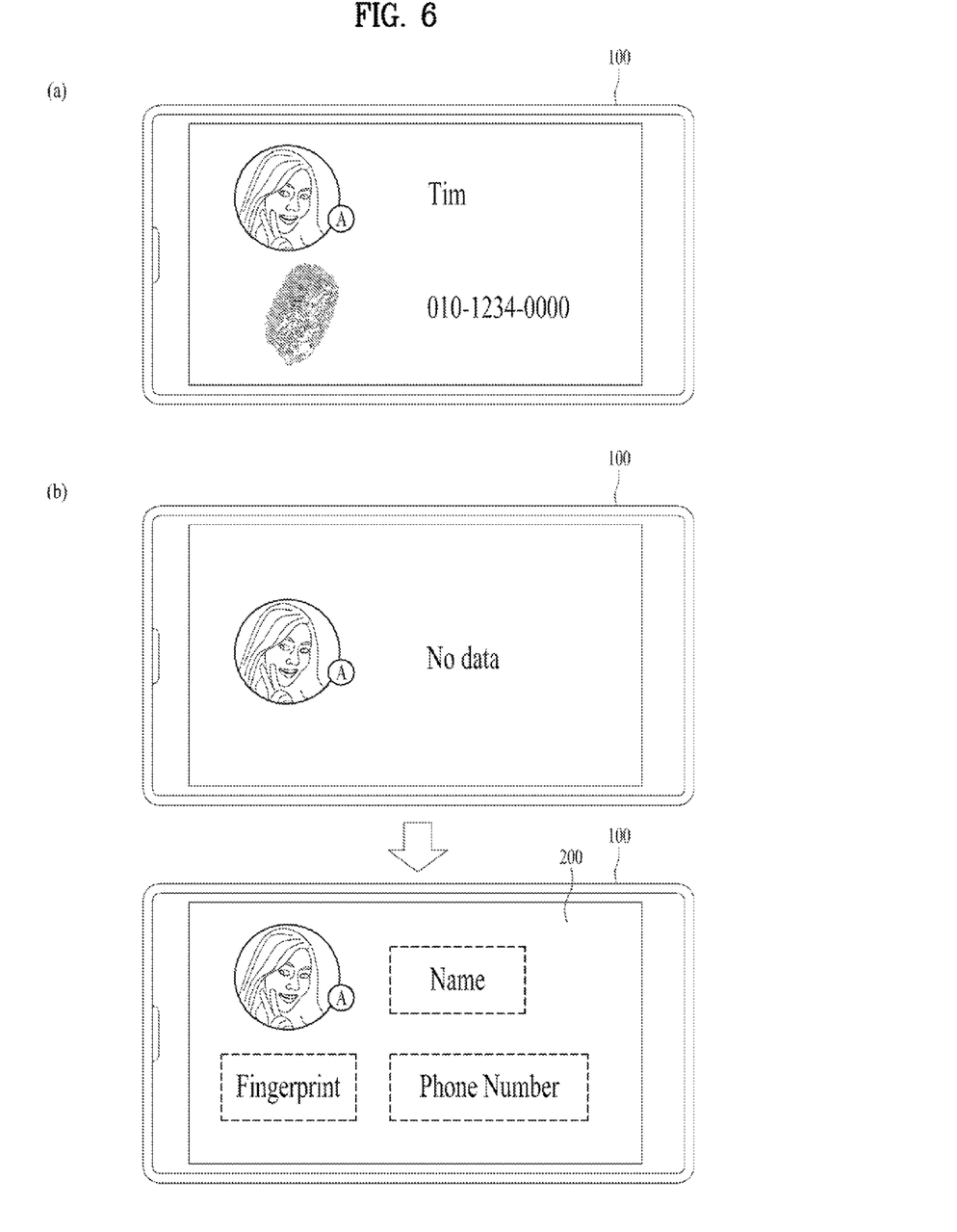
FIG. 6a to FIG. 6b is a diagram of an image transmission interface according to the present specification.

FIG. 6 is a diagram of an image transmission interface according to the present specification. More specifically, FIG. 6a indicates a case that the photographer 10 corresponds to a user registered in the mobile device 100 and FIG. 6b indicate a case that the photographer 10 corresponds to a user not registered in the mobile device 100.

As mentioned earlier in FIG. 4, the mobile device 100 determines whether the photographer of the captured image is a user registered in the mobile device 100 and can transmit the captured image according to the decision. First of all, as depicted in FIG. 6a, if information of a photographer A is stored in the mobile device, the mobile device 100 can determine that the photographer A is the user registered in the mobile device.

In this case, the mobile device 100 can store a face image, a name, cellular phone information, and the like of the photographer A. And, the mobile device 100 can store such biometrics information as fingerprint information, voice information, iris information, and the like of the photographer A. And, the mobile device 100 can store the address of the photographer A, in particular, an e-mail address, an IP address, and the like of the photographer A. Hence, the mobile device can transmit the captured image to the e-mail address or the IP address of the photographer A.

Similar to FIG. 6a, the mobile device 100 determines whether a person included in the captured image is a user registered in the mobile device 100 and if the person corresponds to the user registered in the mobile device, the mobile device 100 can transmit the captured image to an address of the person included in the captured image. In particular, if information of the person C, D, and E depicted in FIG. 4 is stored in the mobile device 100, the mobile device 100 can transmit the captured image to the stored addresses of the person C, D, and E.

Meanwhile, as depicted in FIG. 6b, the mobile device 100 can determine that the photographer A is a user not registered in the mobile device. In this case, since information related to the photographer A is not stored in the mobile device, the mobile device 100 cannot directly transmit the captured image to the photographer A. Hence, if the photographer A is not a registered user, the mobile device 100 can provide the image transmission interface 200. By doing so, such information as an e-mail address, an IP address, and the like as well as such information as a name, a cellular phone number, and the like of the photographer A can be provided to the mobile device 100. And, such biometrics information as fingerprint information, voice information, and the like of the photographer A can be provided to the mobile device 100. Hence, the mobile device 100 can transmit the captured image to the address of the photographer A based on the information inputted via the image transmission interface 200.

Similar to FIG. 6b, if a person included in the captured image corresponds to a user not registered in the mobile device 100, the mobile device 100 can provide the image transmission interface 200. In particular, if information of at least one person among the person C, D, and E depicted in FIG. 4 is not stored in the mobile device 100, the mobile device can transmit the captured image to an address of a corresponding person in a manner of providing the image transmission interface 200 for the corresponding person.

Figure 7:
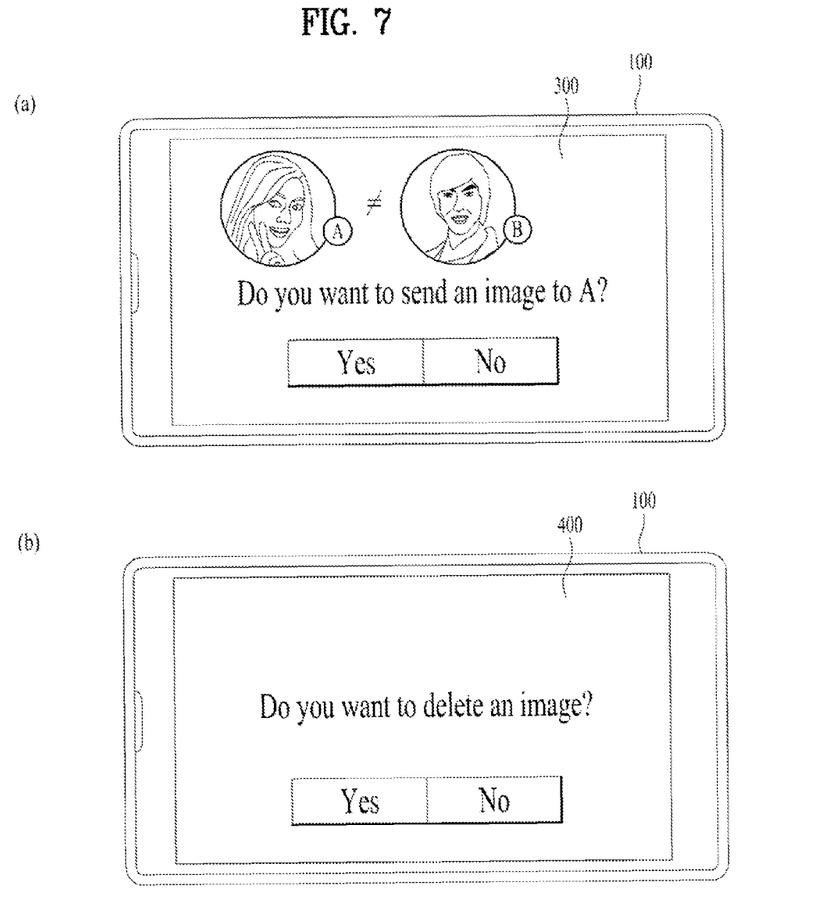
FIG. 7a to FIG. 7b is a diagram of an image share interface and an image deletion interface according to the present specification.

FIG. 7 is a diagram of an image share interface and an image deletion interface according to the present specification. More specifically, FIG. 7a indicates the image share interface in case that the first identification information of the photographer is not matched with the second identification information of the owner of the mobile device 100 and FIG. 7b indicates the image deletion interface in case that the owner of the mobile device 100 is not included in the captured image.

First of all, as mentioned earlier in FIG. 4, if the first identification information of the photographer is not matched with the second identification information of the owner of the mobile device 100, the mobile device 100 can transmit the captured image to the address of the photographer. In this case, as depicted in FIG. 7a, the mobile device can provide the image share interface 300. In this case, the image share interface 300 indicates an interface for selecting whether an image of which the photographer is captured is transmitted to the address of the photographer.

In one embodiment, if 'Yes' is selected on the image share interface 300, the mobile device 100 can transmit the captured image to the address of the photographer. In this case, if the photographer corresponds to a user registered in the mobile device 100, the mobile device 100 can transmit the captured image to the stored address of the photographer. Meanwhile, if the photographer corresponds to a user not registered in the mobile device 100, the mobile device 100 can provide the image transmission interface depicted in FIG. 6b. In another embodiment, if 'No' is selected on the image share interface 300, the mobile device 100 may not transmit the captured image to the address of the photographer.

Meanwhile, as mentioned earlier in FIG. 5, if the owner of the mobile device 100 is not included in the captured image, the mobile device 100 can delete the captured image from the mobile device 100. In this case, as depicted in FIG. 7b, the mobile device 100 can provide the image deletion interface 400. In this case, the image deletion interface 400 indicates an interface for selecting whether an image of which the photographer or the owner of the mobile device 100 is captured is stored in the mobile device 100.

In one embodiment, if 'Yes' is selected on the image deletion interface 400, the mobile device 100 can delete the captured image stored in the storage unit configured for a temporary storage. In another embodiment, if 'No' is selected on the image deletion interface 400, the mobile device can store the captured image stored in the storage unit configured for a temporary storage in a storage unit configured for a long-term storage.

Figure 8:
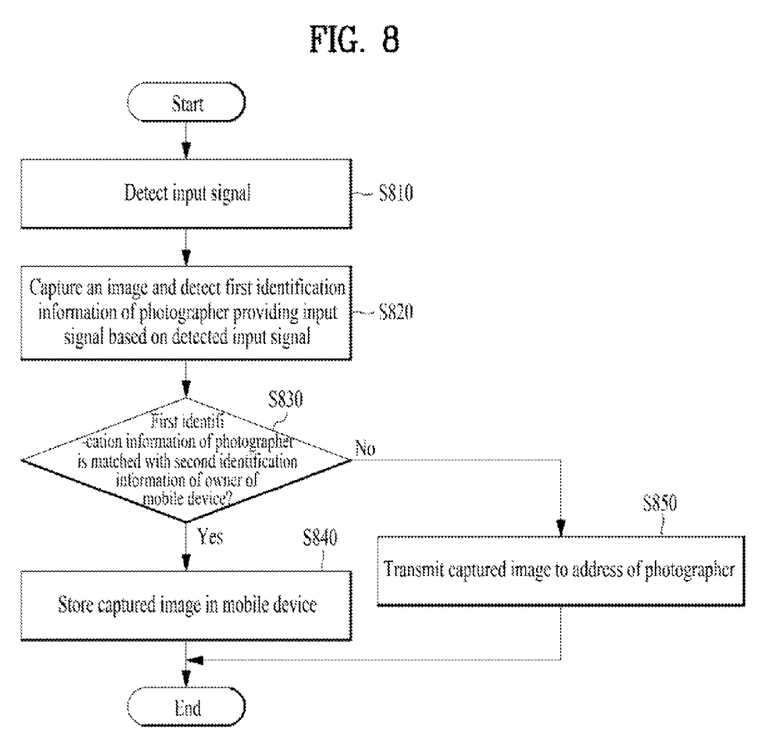
FIG. 8 is a flowchart of a method of controlling a mobile device according to the present specification.

FIG. 8 is a flowchart of a method of controlling a mobile device according to the present specification. Each step depicted in FIG. 8 can be controlled by the processor 160 of the mobile device 100 depicted in FIG. 1.

First of all, the mobile device can detect an input signal [S810]. As mentioned earlier in FIG. 4, the input signal can include at least one signal. In one embodiment, as depicted in FIG. 4a, the mobile device can detect an input signal. In this case, the input signal may correspond to a signal configured to capture an image and configured to detect identification information of a photographer. In another embodiment, the mobile device can detect a plurality of input signals. If a plurality of the input signals corresponds to two input signals, a first input signal may correspond to a signal configured to capture an image and a second input signal may correspond to a signal configured to detect identification information of the photographer.

Subsequently, the mobile device can capture an image and detect first identification information of the photographer providing an input signal based on the detected input signal [S820]. As mentioned earlier in FIG. 4, the first identification information may correspond to biometric information for indicating the photographer. For instance, the first identification information can include facial recognition information, fingerprint information, veins information, pulse information, iris information, voice information, and the like of the photographer.

Subsequently, the mobile device can determine whether the first identification information of the photographer is matched with second identification information of an owner of the mobile device [S830]. As mentioned earlier in FIG. 4, the second identification information may correspond to biometrics information for indicating the owner of the mobile device. For instance, the second identification information can include facial recognition information, fingerprint information, veins information, pulse information, iris information, voice information, and the like of the owner of the mobile device.

In the step S830, if the first identification information of the photographer is matched with second identification information of an owner of the mobile device, the mobile device can store the captured image in the mobile device [S840]. And, as mentioned earlier in FIG. 4, if the owner of the mobile device is included in the captured image, the mobile device can store the captured image in the mobile device irrespective of whether the first identification information of the photographer is matched with second identification information of an owner of the mobile device.

In the step S830, if the first identification information of the photographer is not matched with second identification information of an owner of the mobile device, the mobile device can transmit the captured image to an address of the photographer [S850]. In this case, the address of the photographer may correspond to an e-mail address, an address of an IP (internet protocol) of a device owned by the photographer 10, and the like.

Figure 9:
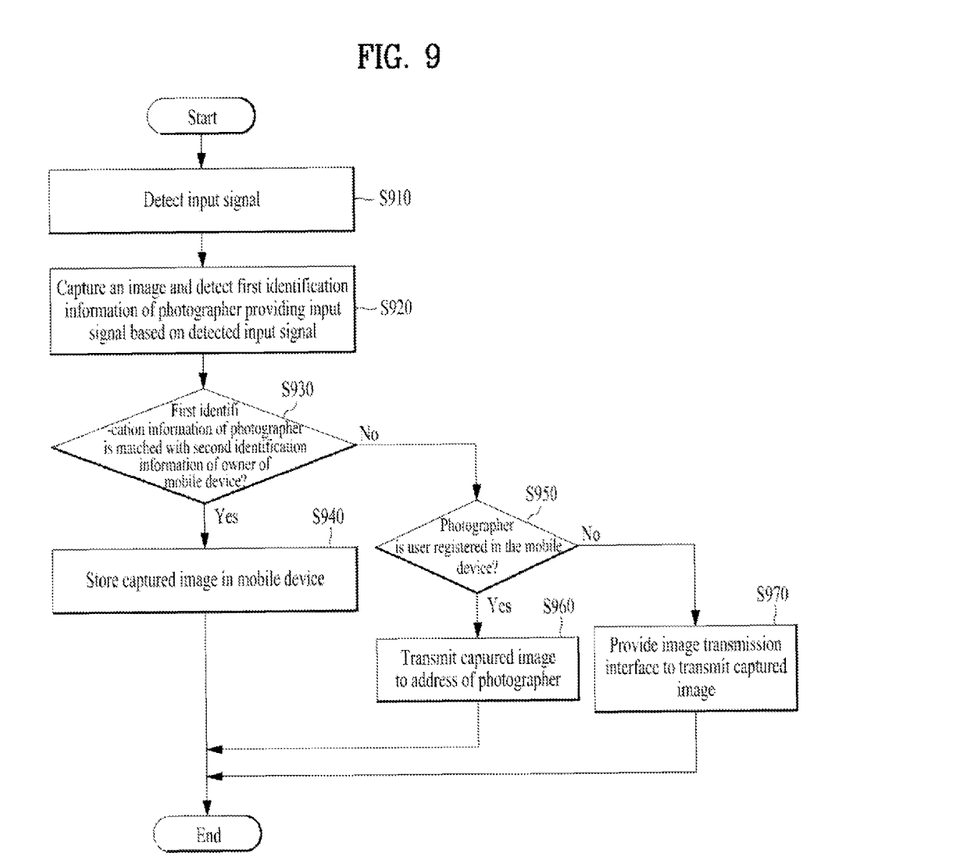
FIG. 9 is a flowchart of a method of controlling a mobile device according to the present specification.

FIG. 9 is a flowchart of a method of controlling a mobile device according to the present specification. Each step depicted in FIG. 9 can be controlled by the processor 160 of the mobile device 100 depicted in FIG. 1. A part identical or corresponding to the embodiment of FIG. 8 is omitted in an embodiment of FIG. 9.

First of all, the mobile device can detect an input signal [S910]. Subsequently, the mobile device can capture an image and detect first identification information of a photographer providing an input signal based on the detected input signal [S920]. Subsequently, the mobile device 100 can determine whether the first identification information of the photographer is matched with second identification information of an owner of the mobile device [S930]. In the step S930, if the first identification information of the photographer is matched with second identification information of the owner of the mobile device, the mobile device can store a captured image in the mobile device [S940].

In the step S930, if the first identification information of the photographer is not matched with second identification information of the owner of the mobile device, the mobile device can determine whether the photographer is a user registered in the mobile device [S950].

In the step S950, if the mobile device determines that the photographer is the user registered in the mobile device, the mobile device can transmit the captured image to an address of the photographer [S960]. In this case, as mentioned earlier in FIG. 6, if the photographer is the user registered in the mobile device, the mobile device can store facial recognition information, a name, cellular phone information, fingerprint information, voice information, and the like of the photographer in the mobile device. And, if the photographer is the user registered in the mobile device, the mobile device can store an e-mail address, an IP address, and the like of the photographer in the mobile device.

In the step S960, if the mobile device determines that the photographer is not the user registered in the mobile device, the mobile device can provide an image transmission interface configured to transmit the captured image [S970]. As mentioned earlier in FIG. 7, the mobile device can receive information of the photographer via the image transmission interface. For instance, the information of the photographer can include a name, fingerprint information, a cellular phone number, an e-mail address, and the like.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A mobile device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a mobile device and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A mobile device, comprising:
 a display unit configured to display visual information;
 a camera unit configured to capture images;
 a storage unit configured to store captured images;
 a communication unit configured to transmit captured images;
 a sensor unit configured to detect a user input and transmit an input signal according to a detected result to a processor; and a processor configured to control the display unit, the image capturing unit, the storage unit, the communication unit, and the sensor unit, the processor is further configured to:

detect an input signal, capture an image and detect first identification information of a photographer providing the input signal, based on the detected input signal, compare the first identification information of the photographer with a second identification information of an owner of the mobile device, store the captured image in the mobile device when the first identification information is matched to the second identification information, and transmit the captured image to an address of the photographer when the first identification information is different from the second identification information.

2. The mobile device of claim 1, wherein the address of the photographer corresponds to an e-mail address of the photographer or an IP (internet protocol) address of a device owned by the photographer.

3. The mobile device of claim 1, wherein the processor is further configured to provide an image share interface to select whether the captured image is transmitted to the address of the photographer when the first identification information of the photographer is not matched with the second identification information of the owner of the mobile device.

4. The mobile device of claim 1, wherein the input signal comprises a first input signal for capturing the image and a second input signal for detecting the first identification information of the photographer.

5. The mobile device of claim 4, wherein the processor is further configured to:

detect the first input signal and the second input signal, capture the image based on the detected first input signal, and detect the first identification information of the photographer providing the second input signal based on the detected second input signal.

6. The mobile device of claim 1, wherein the processor is further configured to recognize at least one person contained in the captured image and transmit the captured image to an address of the at least one person contained in the captured image.

7. The mobile device of claim 6, wherein the processor is further configured to:

transmit the captured image to the address of the at least one person when the at least one person contained in the captured image corresponds to a user registered in the mobile device, and provide an image transmission interface to transmit the captured image when the at least one person contained in the captured image corresponds to a user not registered in the mobile device.

8. The mobile device of claim 1, wherein the processor is further configured to recognize at least one person contained in an image sensed before the input signal is detected.

9. The mobile device of claim 8, wherein the processor is further configured to store the captured image when the at least one person comprises the owner of the mobile device.

10. The mobile device of claim 1, wherein if the first identification information of the photographer is not matched with the second identification information of the owner of the mobile device, the processor is further configured to transmit the captured image to the address of the photographer when the photographer is a user registered in the mobile device and provide an image transmission interface for transmitting the captured image when the photographer is not the user registered in the mobile device.

11. The mobile device of claim 10, wherein the image transmission interface is capable of inputting the address of the photographer receiving the captured image.

12. The mobile device of claim 10, wherein the image transmission interface is capable of inputting biometrics information of the photographer receiving the captured image.

13. The mobile device of claim 1, wherein the first identification information comprises biometrics information of the photographer and the second identification information comprises biometrics information of the owner of the mobile device.

14. The mobile device of claim 13, wherein the biometrics information comprises at least one of facial recognition information, fingerprint information, vein information, pulse information, iris information, and voice information.

15. The mobile device of claim 14, wherein if the biometrics information corresponds to the facial recognition information, the camera unit is configured to face towards the photographer when the input signal is detected.

16. The mobile device of claim 15, wherein the processor is further configured to determine facial recognition information detected near the mobile device among a plurality of the facial recognition information as the first identification information of the photographer when the plurality of facial recognition information are detected.

17. The mobile device of claim 16, wherein the processor is further configured to delete the captured image after the captured image is transmitted to the address of the photographer when the first identification information of the photographer is not matched with the second identification information of the owner of the mobile device and a facial recognition information of the owner of the mobile device is not detected from a plurality of the facial recognition information.

18. The mobile device of claim 17, wherein the processor is further configured to provide an image deletion interface before the captured image is deleted.

19. A method of controlling a mobile device, the method comprising:

detecting an input signal;

capturing an image and detecting first identification information of a photographer providing the input signal based on the detected input signal;

compare the first identification information of the photographer with a second identification information of an owner of the mobile device, storing the captured image in the mobile device when the first identification information is matched the second identification information; and transmitting the captured image to an address of the photographer when the first identification information is different from the second identification information.

* * * * *